(12) United States Patent
Corthell

(10) Patent No.: US 6,192,477 B1
(45) Date of Patent: Feb. 20, 2001

(54) METHODS, SOFTWARE, AND APPARATUS FOR SECURE COMMUNICATION OVER A COMPUTER NETWORK

(75) Inventor: David Corthell, San Francisco, CA (US)

(73) Assignee: Dagg LLC, Lake Oswego, OR (US)

(*) Notice: Under 35 U.S.C. 154(b), the term of this patent shall be extended for 0 days.

(21) Appl. No.: 09/243,097

(22) Filed: Feb. 2, 1999

(51) Int. Cl.[7] .................................................. G06F 11/00
(52) U.S. Cl. .............................................. 713/201; 380/49
(58) Field of Search .................................. 713/201, 200, 713/202; 380/4, 23, 25, 30, 42, 49; 340/825.31, 825.34

(56) References Cited

U.S. PATENT DOCUMENTS

| | | | |
|---|---|---|---|
| 3,936,601 | * | 2/1976 | Obeginski ............................ 178/22 |
| 4,672,572 | * | 6/1987 | Alsberg ............................... 364/900 |
| 4,882,779 | * | 11/1989 | Rahtgen .............................. 380/24 |
| 5,010,572 | * | 4/1991 | Bathrick et al. ..................... 380/21 |
| 5,126,728 | * | 6/1992 | Hall .................................. 340/825.3 |
| 5,204,903 | * | 4/1993 | Okada et al. ....................... 380/46 |
| 5,311,593 | * | 5/1994 | Carmi ................................ 380/23 |
| 5,428,745 | * | 6/1995 | De Breijn et al. ................... 395/200 |
| 5,561,770 | * | 10/1996 | De Bruijn et al. .................. 395/200.06 |
| 5,594,796 | * | 1/1997 | Grube et al. ......................... 380/25 |
| 5,619,671 | | 4/1997 | Bryant et al. ....................... 395/412 |
| 5,623,601 | | 4/1997 | Vu ...................................... 395/187.01 |
| 5,628,023 | | 5/1997 | Bryant et al. ....................... 395/800 |
| 5,864,683 | | 1/1999 | Boebert et al. ..................... 395/200.79 |
| 5,892,903 | | 4/1999 | Klaus ................................. 395/187.01 |
| 5,961,645 | | 10/1999 | Baker ................................. 713/201 |
| 5,991,402 | | 11/1999 | Jia et al. .............................. 380/9 |
| 6,028,937 | * | 2/2000 | Tatebayashi et al. ................ 380/25 |

* cited by examiner

*Primary Examiner*—Nadeem Iqbal
(74) *Attorney, Agent, or Firm*—David P. Lentini (57) ABSTRACT

A method for performing secure communication between a first user's computer and second remote computer over a computer network is described. According to one embodiment of this aspect, the data space of the first computer is partition into a first secure portion and a second network interface portion. Communication is established between the first and a second computer, and redirection and filter mechanisms are initialized. An instruction is received by the first computer, analyzed by the redirection mechanism, and passed to the filter if the instruction is a protected instruction. The protected instruction is verified by the filter and processed if the verification is successful.

33 Claims, 8 Drawing Sheets

METHODS, SOFTWARE, AND APPARATUS FOR SECURE COMMUNICATION OVER A COMPUTER NETWORK

BACKGROUND OF THE INVENTION

1. Field of the Invention

The present invention relates to computer networks, and, more specifically, to providing data security for computers communicating across an unsecured computer network communications link. The present invention has applications in the areas of computer science and computer network security.

2. The Related Art

Computer network traffic has grown exponentially over the past two decades. Disconnected desktop computers have been transferred to large networks of networked computers due, in part, to advances in networking technology such as modem and Ethernet connections that have made the formation of computer networks financially practical. Over the past decade, the reach of computer communications has become global due to the expansion of users on the Internet. This worldwide computer network has provided millions of computer users with access to information and commerce opportunities unparalleled in history.

Access to these resources and opportunities has not come without a price. The rise of computer networks has also spawned new risks for users in the form of information theft and/or sabotage. Such theft and sabotage can be wrought by "hackers": individuals who attempt to gain access to data stored on another's computer system, often for the sheer sport of the activity. Some hackers are more malicious, using software to install computer "viruses" on client computers to alter or destroy data or steal trade secrets. However, even organizations such as governments and businesses also "lift" and/or modify user data when the user connects to apparently "innocuous" servers over the World-Wide Web. For example, a business or government agency could establish an engine to scan surreptitiously the contents of a client computer's drive(s) when that computer logs-in to a Web server. The data obtained from the drive could be used for marketing or espionage purposes.

To counter these threats, many local area networks ("LANs") use firewalls to protect connected to the local network from the above-described threats. However, firewalls suffer from drawbacks. First, firewall protection is generally designed for computer networks; thus, protection for individual users is not readily available. Second, firewall protection is expensive. Thorough firewall protection often requires the purchase and maintenance of one or more specialized computer systems. Third, firewalls can only protect against known threats. Thus, the firewall software must be reconfigured repeatedly as new threats appear.

For individual users, some protection is available using various software packages that monitor certain actions taken by software running on the computer and/or scan files for known anomalies, such as code patterns that are consistent with a computer virus. As with firewalls, these software packages must be constantly updated to scan for the latest virus code patterns. Also, these packages offer limited protection for more dynamic forms of intrusion, such as snooping and/or copying performed by malicious Web sites.

Thus, there is a need for cheaper, simpler software and methods to protect the integrity of data stored on computers used to communicate over computer networks, especially unregulated networks such as the Internet. More particularly, such software and methods will protect against attacks by viruses as well as attempts to copy or alter information on the user's computer by sever computers across in communication with the user's computer across a computer network. The present invention meets these and other needs.

SUMMARY OF THE INVENTION

The present invention provides relatively simple methods, software, and system for maintaining data security on a first computer in communication with another computer (e.g., a server) across a unsecure computer network such as the Internet. The methods, software, and systems described herein can be implemented on individual computers, computers coupled with local- or wide-area networks, and client computers in a client-server environment (e.g., thin clients).

In a first aspect, the present invention provides a method for performing secure communication between a first user's computer and second remote computer over a computer network. According to one embodiment of this aspect of the invention, the data space of the first computer (i.e., the memory associated with data and instructions stored on the first computer at the time communication between the first and second computer is initiated) is partition into a first secure portion and a second network interface portion. Communication is established between the first and second computer, and redirection and filter mechanisms are initialized. An instruction is received by the first computer. The instruction is analyzed by the redirection mechanism, and passed to the filter if the instruction is a protected instruction. The protected instruction is verified by the filter and processed if the verification is successful.

In another embodiment, data and instructions necessary for performing communications over the network are copied from the secure portion to the network interface portion. In a more specific embodiment, the method of the invention includes disconnecting the first and second computers from network communication and comparing the files stored in the secure and network interface portions. In a still more specific embodiment, files that were changed during the communications session between the first and second computers are restored to their original state.

In yet another embodiment, the method of the invention includes passing non-protected instructions to the operating system of the first computer, and notifying the user of the first computer that a received instruction is a protected instruction. The user can then determine whether to execute the instruction. Instructions not verified can be disallowed. In still other embodiments, instructions and/or files stored on the first computer are marked and/or tagged. In an alternative embodiment, instructions and/or files received by the first computer are marked and/or tagged.

In a second aspect, the present invention provides systems for performing secure communication between a first computer containing secure data is a data space and a second remote computer across a computer network. The system of the invention includes, in one embodiment, a first data space partition is configured to store data such that the data cannot be modified during the communication between said first and second computers. A second data space partition is configured to store data to enable communication between said first and second computers over the network. A redirection mechanism configured to receive data and instructions from the second computer over said computer network is also provided. The redirection mechanism is configured to determine whether the received data and instructions include instructions to perform protected operations. The redirection mechanism is coupled with a filter mechanism that is configured to receive instructions to perform protected operations from the redirection mechanism and verify those instructions.

In one embodiment of the second aspect of the present invention, the second data space partition includes images of files stored in the first data space partition. In a more specific embodiment, these images include operating system files to enable function of the images of the executable files stored in the second data space partition. In another embodiment, the filter is coupled with, and forwards to, the image files verified instructions. In still another embodiment, the operating system of the first computer is stored in the first data portion and non-protected instructions are forwarded to the operating system directly. In yet another embodiment, the filter is configured to abort instructions that are not verified. In still another embodiment, the user can override the filter. In still another embodiment, a comparator is provided to compare files stored in the first data portion with image files stored in the second data portion to determine if the image files have been altered.

In a third aspect, the present invention provides a computer-readable medium having computer-readable program code devices embodied thereon to cause a computer to perform the above-described steps of the method of the invention.

These and other aspects and advantages will become apparent when the Description below is read in conjunction with the accompanying Drawings.

DESCRIPTION OF SOME EMBODIMENTS OF THE INVENTION

The present invention provides methods, systems, and software for protecting networked computers from unauthorized operations directed from a remote computer. The methods, software, and systems described herein can be used on individual computers (e.g., computers that are connected to networks only sporadically) as well as computers connected to local- and wide-area networks continuously. "Wide area networks" as used herein includes computers connected to the Internet, either directly (e.g., using an Internet Service Provider) or via a local area network. Furthermore, the systems, software, and methods described herein can be performed on computers using a client-server model. The present invention further provides for the segregation of data to prevent unauthorized modification of the data. Thus, for at least these reasons, the present invention will be seen to address the deficiencies of current computer protection technologies.

Figure 1:
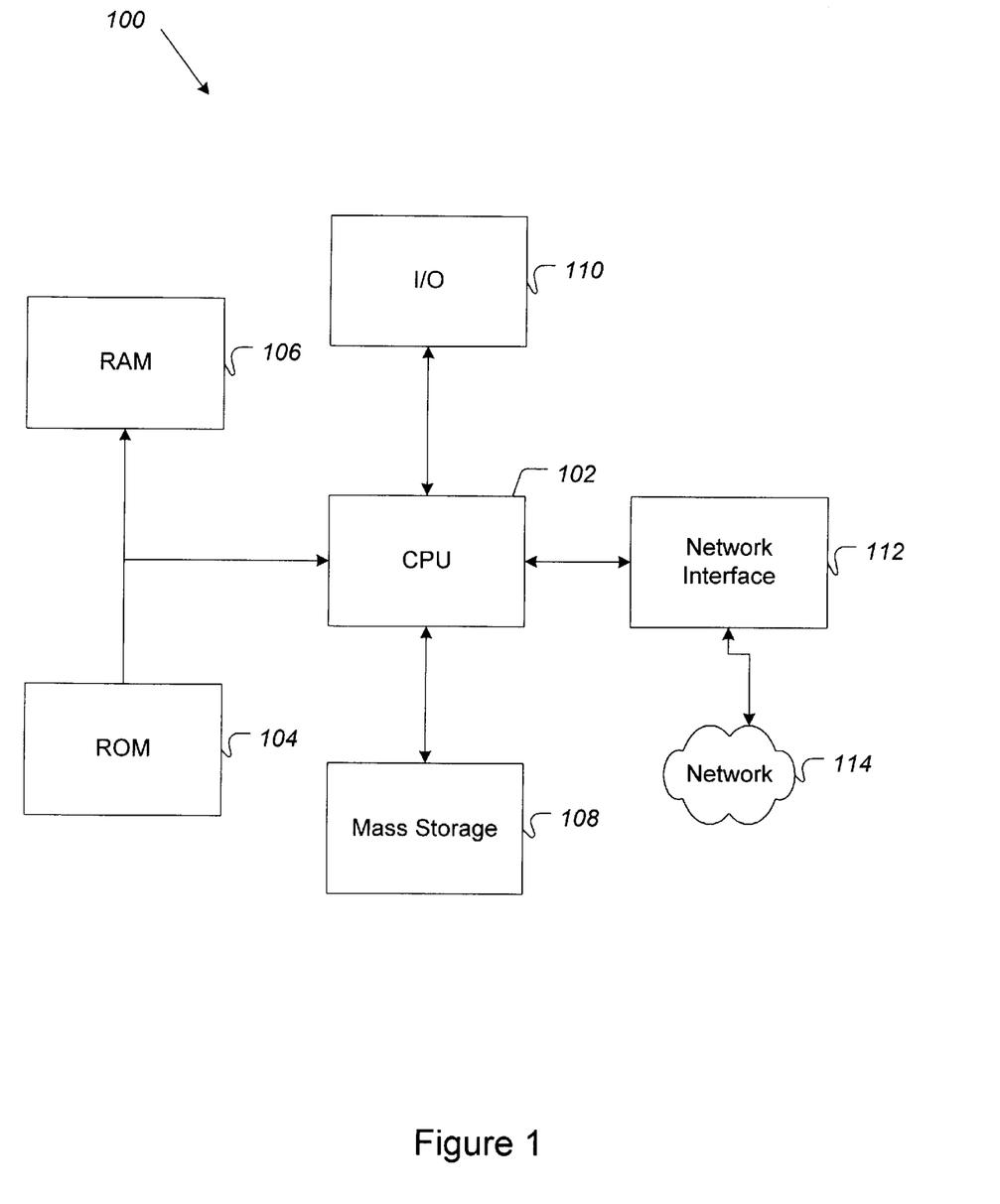
FIG. 1 is a schematic representation of a computer system suitable for use with the present invention.

FIG. 1 at 100 shows a typical computer-based system in accordance with the present invention. Shown is a central processing unit 102 (CPU) which is coupled to memory devices including read only memory 104 (ROM) and random access memory 106 (RAM). As is well known in the art, ROM 104 acts to transfer data and instructions unidirectionally to the CPU and RAM 106 is used typically to transfer data and instructions in a bidirectional manner. A mass memory device 108 is also coupled bidirectionally to CPU 102 and provides additional data storage capacity. The mass memory device 108 may be used to store programs, data and the like and may take the form of a magnetic or paper tape reader or some other well known device (e.g., CD-ROM). It will be appreciated that the information retained within the mass memory device 108, may, in appropriate cases, be incorporated in standard fashion as part of RAM 106 in the form of virtual memory. CPU 102 is also coupled to one or more input/output devices 110 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally can be coupled to a computer or telecommunications network 114 using a network connection as shown generally at 112. The above-described devices and materials will be familiar to those of skill in the computer hardware and software arts (see, e.g., Ralston, Anthony, and Reilly, Edwin D. 1993. *Encyclopedia of Computer Science*. Van Norstrand Reinhold; Herzog, James H. 1996. *Design and Organization of Computing Structures*. Franklin, Beedle & Associates, Inc.; Stone, Harold S. 1983. *Microcomputer Interfacing*. Addison Wesley; Martin, James, and Chapman, Kathleen K. 1989. *Local Area Networks: Architectures and Implementations*. Prentice Hall.)

Figure 2:
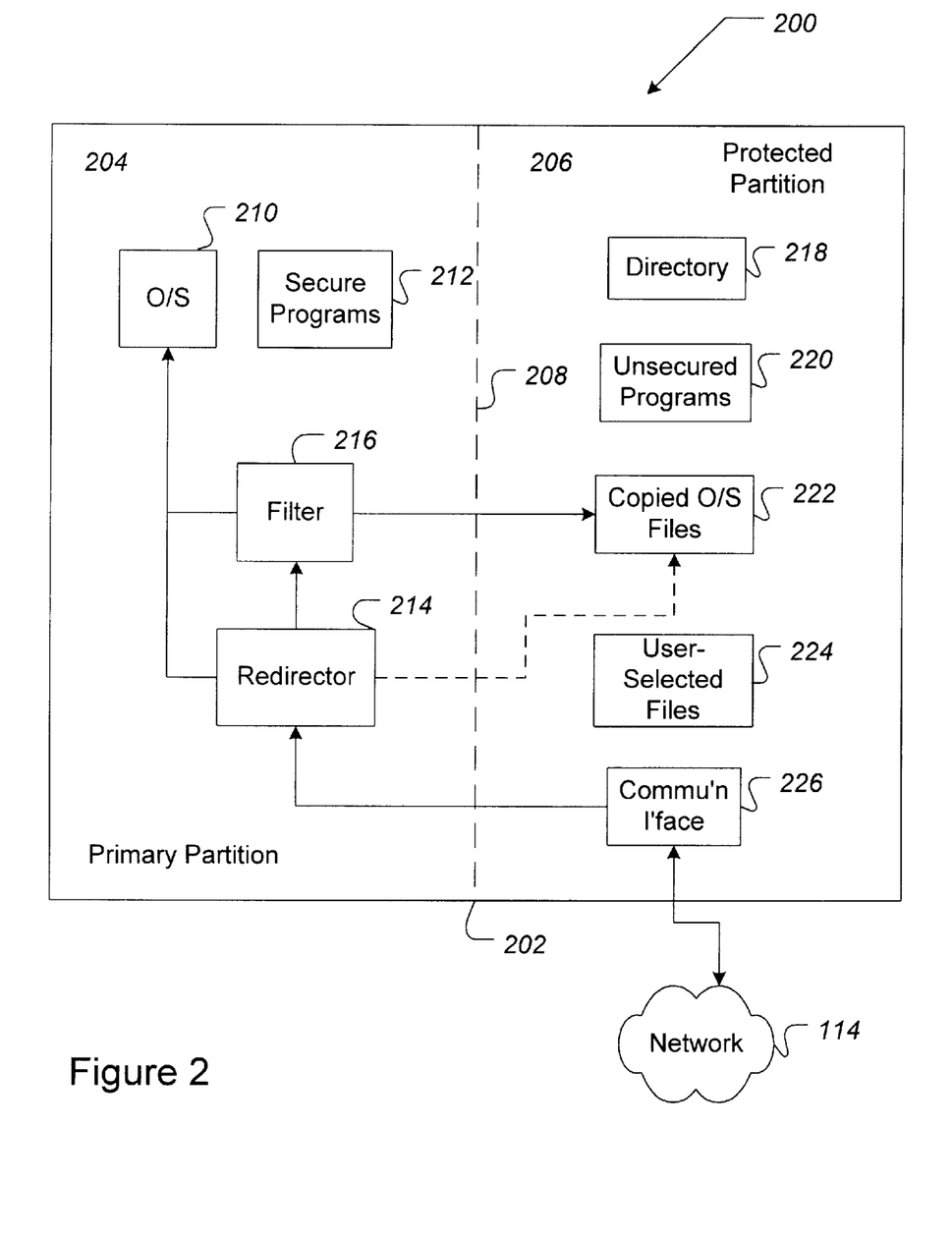
FIG. 2 is a schematic representation of the partitioning of a computer's data space into a Primary Partition and a Protected Partition in accordance with one embodiment of the present invention.

FIG. 2 at 200 illustrates one example of the partitioning of the data space 202 of computer 100 into Primary and Protected Partitions at 204 and 206 respectively. Data space 202 comprises the data store in the volatile memory of computer 100. Such memory will include data and instructions stored in RAM 106 and mass storage 108. Communication of data and instructions between Partitions 204 and 206 can be performed as indicated by dashed separator 208 and as described in greater detail hereinbelow. In one embodiment, data can be transferred from Primary Partition 204 to Protected Partition 206, but not vice versa. In an alternative embodiment, data can be transferred between the Partitions, but any transfer of data from Protected Partition 206 to Primary Partition 204 must be approved by the user (such approval can be provided beforehand by choice of one or more operating parameters). Primary Partition 204 includes data and instructions that are to be kept secure or are not used in communication over the network, such as operating system ("O/S") 210 and secure programs 212. Primary Partition 204 further includes a Redirector 214 coupled with a Filter 216, both of which are described in greater detail hereinbelow. The term "partition" will be understood to include any type of memory partition known to those of skill in the computer science arts, including both physical partitions and logical or "virtual" partitions.

Protected Partition 206 includes those files and data necessary for performing network communication and tasks over the network. In one embodiment, these files are "images" of files kept in Primary Partition 204. Examples of such files include, but are not limited to, Directory (or Directories) 218, programs that are used for "unsecure" operations (e.g., browser programs, e-mail programs, newsreaders and the like) 220, certain O/S files necessary to support operations by the software installed on the Protected Partition 222, various user-selected files 224, and Communication Interface (including drivers, protocol stacks, and the like) 226 which is connected to Network 114.

In one embodiment, Redirector 214 is coupled with Filter 216 and O/S 210 such that data and instructions that are processed by Redirector 214 can be passed to either Filter 216 or O/S 210 as described in greater detail below. Redirector 214 is also coupled with Communications Interface 226 such that data and instructions received by Communications Interface 226 are passed to the Redirector for processing. Similarly, Filter 216 is coupled to O/S 210 and O/S image files 222 so that data and instructions passed from Redirector 214 to Filter 216 can be processed by Filter 216 and forwarded to O/S 210 and/or O/S image files 222, again as described in greater detail below. In some embodiments, Redirector 214 can also be coupled with O/S image files 222 as indicated by the dashed line. It will be appreciated by those having skill in the computer science arts that various other connections among the files in each of the primary and Protected Partitions will exist (although not between files in the primary and Protected Partitions). However, these connections are not shown for the sake of clarity.

In another embodiment, the data and instructions contained in the primary and/or Protected Partitions prior to connection to the network are tagged and/or marked to identify the data and instructions as trusted (since the data and instructions could not have been altered). As used herein, "tagging" refers to the labeling of a file with an identifier using any method known to those of skill in the computer science arts. "Marking" as used herein refers to the application of a bit- or byte-level identifier using any method known to those of skill in the computer science arts. Generally, the tag or mark should be sufficiently unique to avoid easy anticipation by anyone desiring to pass spurious instructions and/or data to the user across the network.

A variety of techniques can be used to accomplish such tagging and/or marking. For example, an encrypted code word can be used. Alternatively, a private/public encryption scheme can be used to generate a unique tag or mark. Still other methods of generating suitable tags or marks will be known to those of skill in the computer science and computer security arts. The use of either or both tagging and marking can be made a user option. In one embodiment, the user is provided not only with the option to use tagging and/or marking, but also the types of data and/or instructions to be tagged or marked. Generally, it is anticipated that marking executable instructions is the most efficient option.

In alternative embodiments, data coming from the network to the user's computer can be tagged and/or marked as just described. In such embodiments, the operation of the Redirector and Filter will be altered accordingly to treat untagged or unmarked data and instructions as "trusted", and process tagged or marked data and instructions as "suspect".

In one embodiment, the Redirector and Filter are protected from corruption or attack by comparison of the operating code that implements the Redirector and Filter with archived code that is write-protected. A variety of comparison methods can be used to perform this comparison, e.g., a checksum or bit-by-bit comparison. The checks can be performed in a "continuous" or quasi-continuous fashion (for example, as a background process). Alternatively, the checks can be performed either before and/or after a communications session. In another alternative, the user can specify a time interval at which the comparison will be performed. If the comparison fails (i.e., the operating code is not faithful to the archived code), then the archived code can be written over the corrupted code to provide thereby a faithful working copy.

In one embodiment, the user can switch freely from operating software in the Protected Partition to operating software in the Primary Partition at will (e.g., using a hot key). Thus, for example, a user can browse and download information from the Internet using software in the Protected Partition, and switch to a word processor in the Primary Partition. Use of the methods and software described herein provides security for data in the Primary Partition while the user is connected to the outside network since instructions and data downloaded to the Protected Partition cannot be transferred to the Primary Partition without user approval.

Figure 3:
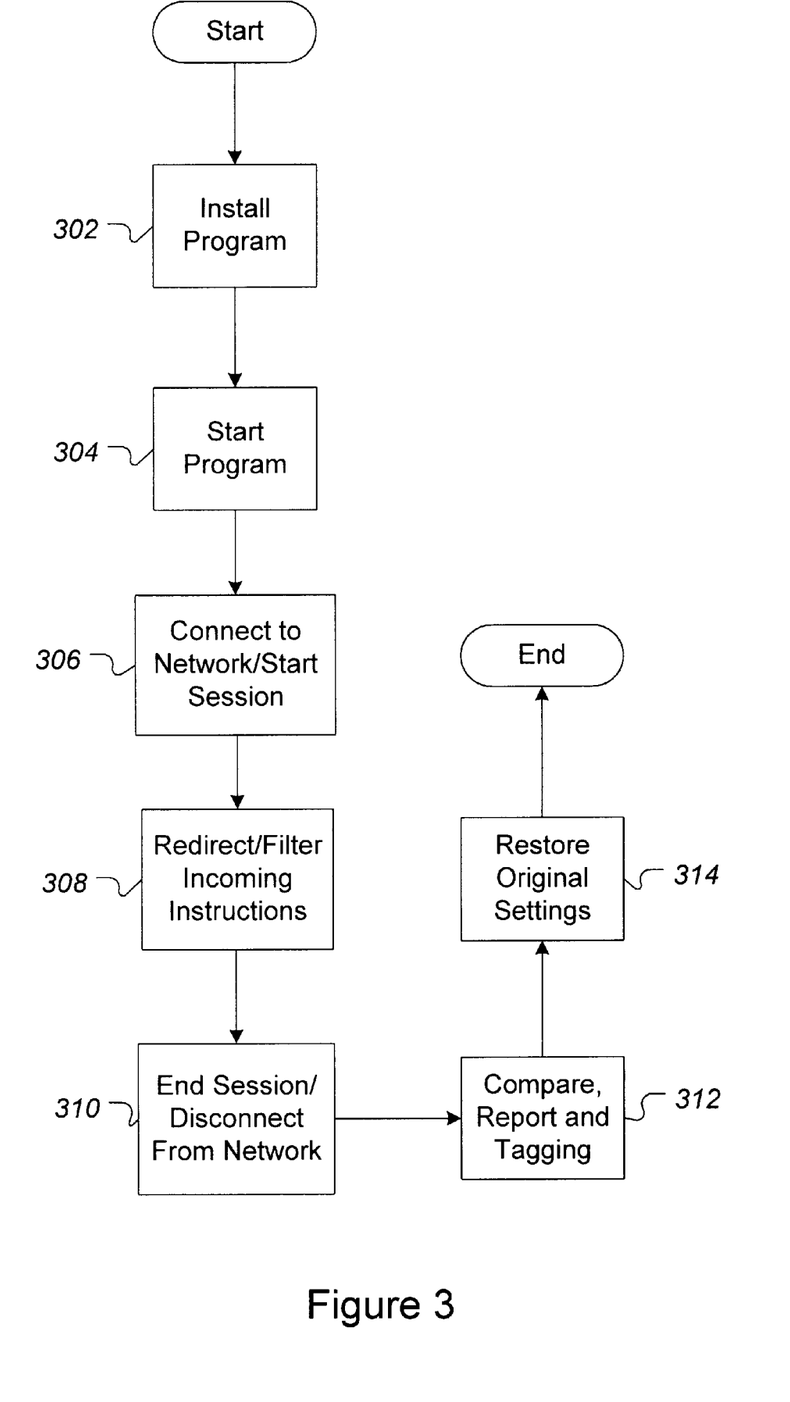
FIG. 3 is a flowchart illustrating the operation of one embodiment of a method for protecting data on a computer systems in accordance with the present invention.
Figure 4:
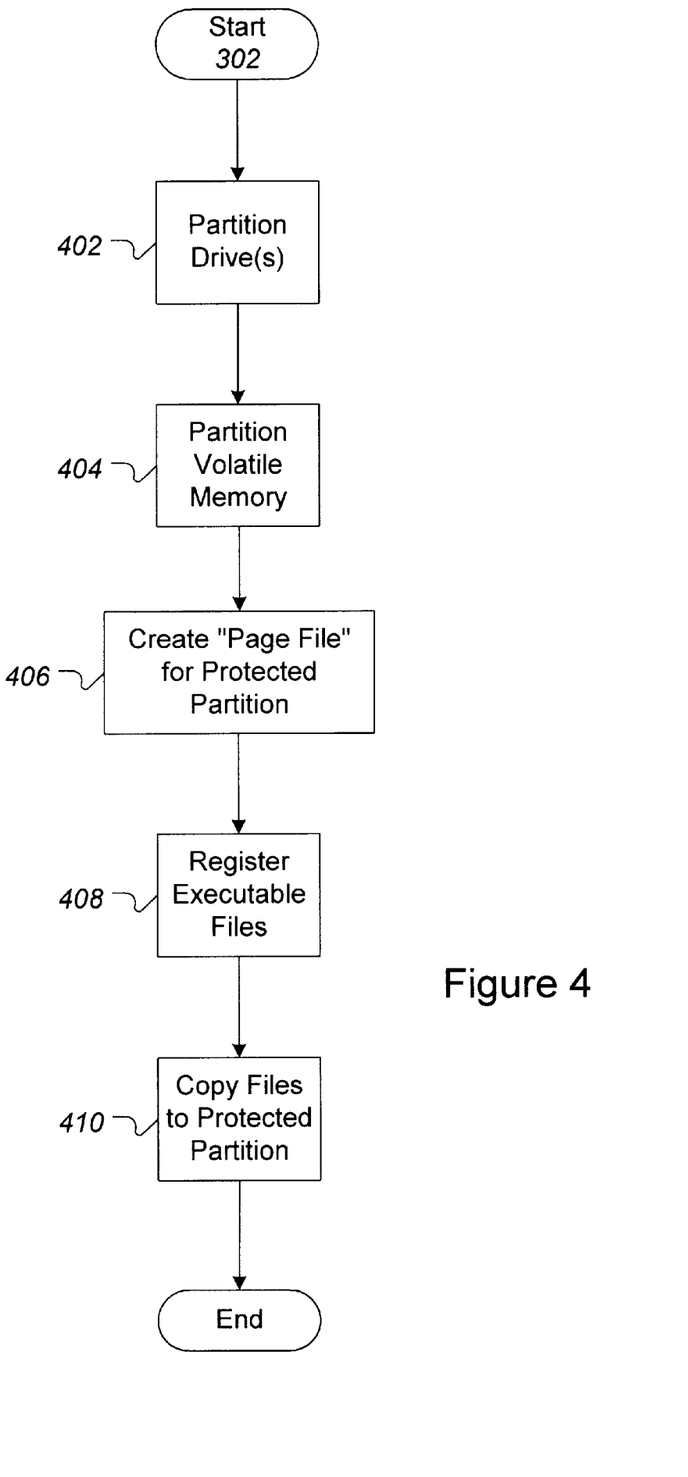
FIG. 4 is a flowchart illustrating the operation of step 302 in greater detail.

FIG. 3 illustrates one embodiment of the overall operation of the data security aspect of the invention. At step 302 the user installs software and data on his or her computer. The data can be tagged as described above during this procedure. One embodiment for this step is described with reference to FIG. 4. Starting at step 402 the writeable mass storage memory (i.e., the hard drive) is partition into primary and protected partitions as described above. At step 404 the volatile memory (i.e., the RAM) is also partitioned. At step 406, a virtual memory space for the RAM is also created. The vial memory maps the partitioned RAM onto a portion of the Protected Partition. At step 408 the executable files are registered with the redirector and filter. Tagging of the instructions for the executable files can be performed at this step. These steps can be performed automatically, or with user-defined parameters. At step 410 the files needed for the network session are copied and/or installed from the Primary Partition to the Protected Partition. The files in the Primary Partition can be read- and/or write-protected at the user's option. Various options can be provided for including the selection of individual file, specific file types (e.g., only output files), or all files. The write-protection of the files in the Protected Partition can be removed selectively during the session as described below.

Figure 5:
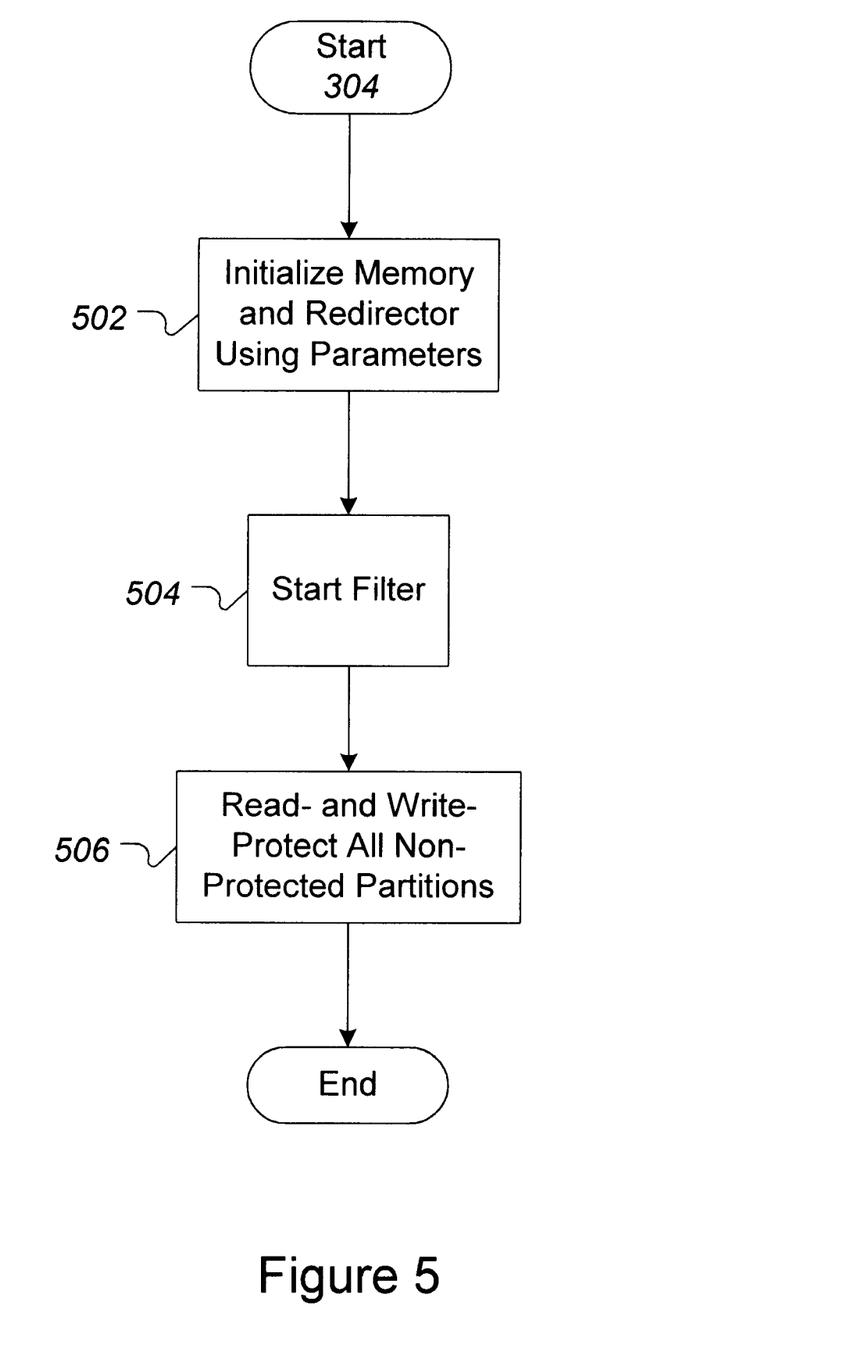
FIG. 5 is a flowchart illustrating the operation of step 304 in greater detail.

Returning to FIG. 3, at step 304 the user starts and initializes the protection software. One embodiment of this step is illustrated in FIG. 5. At step 502, the Redirector and memory are initialized using any user-defined parameters. Such parameters include, but are not limited to, setting trust levels and partition sizes. At step 504, the filter is initialized. At step 506 all partitions outside of the Protected Partition are read- and/or write-disabled at the user's determination. Returning again to FIG. 3, at step 306 the user connects to a remote computer over a network using usual methods and software. At step 308 instructions and data received from the remote computer are redirected and filtered. Two exemplary embodiments for the operation of step 306 are provided in FIGS. 6 and 7.

Figure 6:
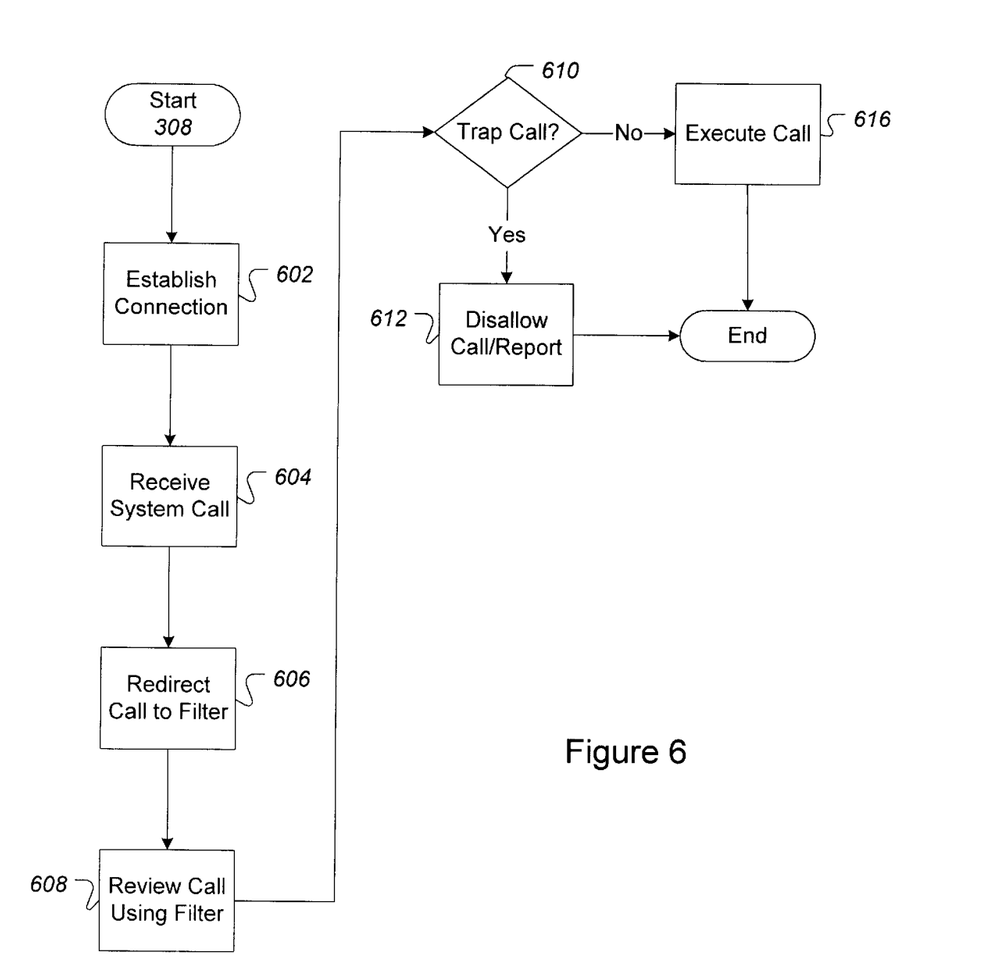
FIG. 6 is a flowchart illustrating a first embodiment for the operation of step 308 in greater detail.

FIG. 6 illustrates one embodiment for performing step 308. At step 602 a connection between the user's computer and the network is established. A system call is received at step 604. Such calls include, but are not limited to, file system operations, read/write operations, software installation, and calls to access other computers connected to the user's computer. At step 606 the system call in redirected to the Filter (by Redirector 214) and the call is reviewed at step 608. At step 610 a determination is made whether to trap the call. This determination can be made in a variety of ways, such as the application of pattern matching or heuristics to the trapped call or by examining the call for a tag or mark as described above. If the call is trapped, then, following the "Yes" branch of step 610, the call is disallowed, a report of the call is made at step 612, and the process terminates. Otherwise, the "No" branch of step 610 is followed, the call is executed at step 614 (by passing the call to the O/S or one of its image files), and the process terminates. In some embodiments, incoming data can be buffered by the filter so the data can be processed prior to being routed to a particular device(s). For example, video and/or audio data often are processed using specialized processors and memory. Often such information is transmitted to the user in a "stream" to allow for continuous play. In such cases, prior processing and buffering by the filter can be employed to maintain performance and security.

Figure 7:
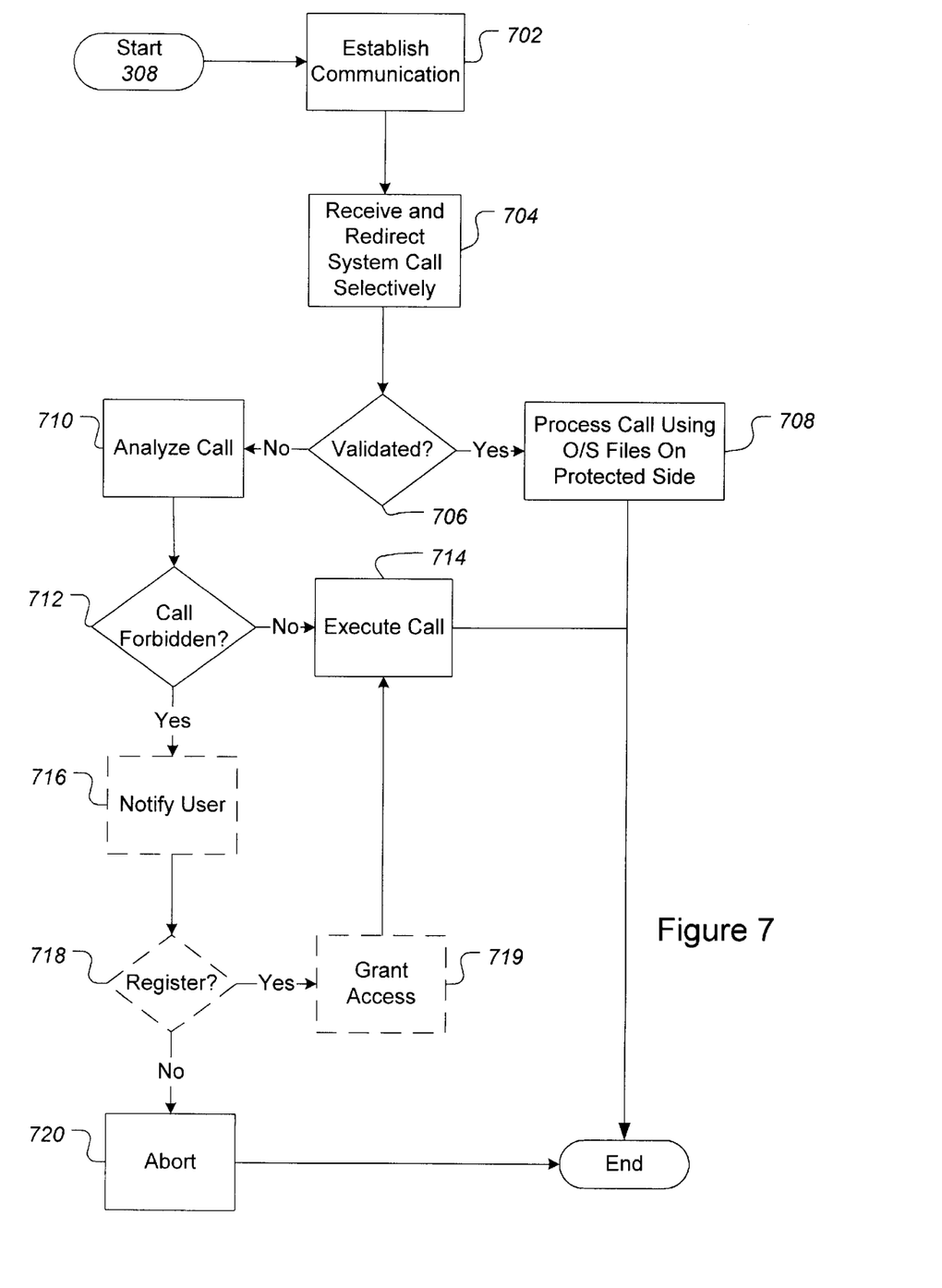
FIG. 7 is a flowchart illustrating a second embodiment for the operation of step 308 in greater detail.

FIG. 7 illustrates an alternative embodiment of step 308 the invention. A connection between the user's computer and a remote computer (e.g., a server) is established at step 702. Data and instructions from both the user's and remote computers are received and redirected selectively at step 704. As described above, in one embodiment, the selective redirection includes forwarding system calls from Redirector 214 to Filter 216 At step 706 the call is validated. If the call is valid, i.e., the call is tagged or marked as described above, then following the "Yes" branch of step 706 to step 708, the call is processed using the files on the Protected Partition (e.g., using O/S file images). Otherwise, the call is determined to be not valid, i.e., no tag or mark is present, and, following the "No" branch of step 706 to step 710, the content of the call is analyzed. At step 712 a determination is made whether the call is forbidden, i.e., the call represents an unreasonable security risk. If the risk to the user's data is determined to be reasonable, then the "No" branch of step 712 is followed to step 714 where the call is executed and the process terminates. Otherwise, the call is determined to be a security risk. In addition, any tags or marks present on data/instructions being sent from the user's computer to the remote computer are stripped by the filter (step not shown).

In one embodiment (indicated by the dashed boxes), if the call is determined to be a risk, then the "Yes" branch of step 712 is followed to step 716 at which the user is notified that a potentially compromising instruction has been received. At step 718 the user has the option of registering the call. If the user chooses to register the call, then the "Yes" branch of step 718 is followed to step 719 where access to the system and file resources necessary to perform the call is granted and the call is executed at step 714 as described above. The source and nature of the call can also be logged so the call will be validated by the filter if received from that source during another session. The process then terminates. In other embodiments, the user can be provided with various choices regarding the details of the call, the source, and the degree of trust to be accorded the call if received in the future. Such options will be familiar to those of skill in the computer science and computer security arts. Otherwise, the user can refuse to override the filter's determination and the call is aborted at step 720. Alternatively, steps 716–719 can be omitted and the call is aborted automatically.

Figure 8:
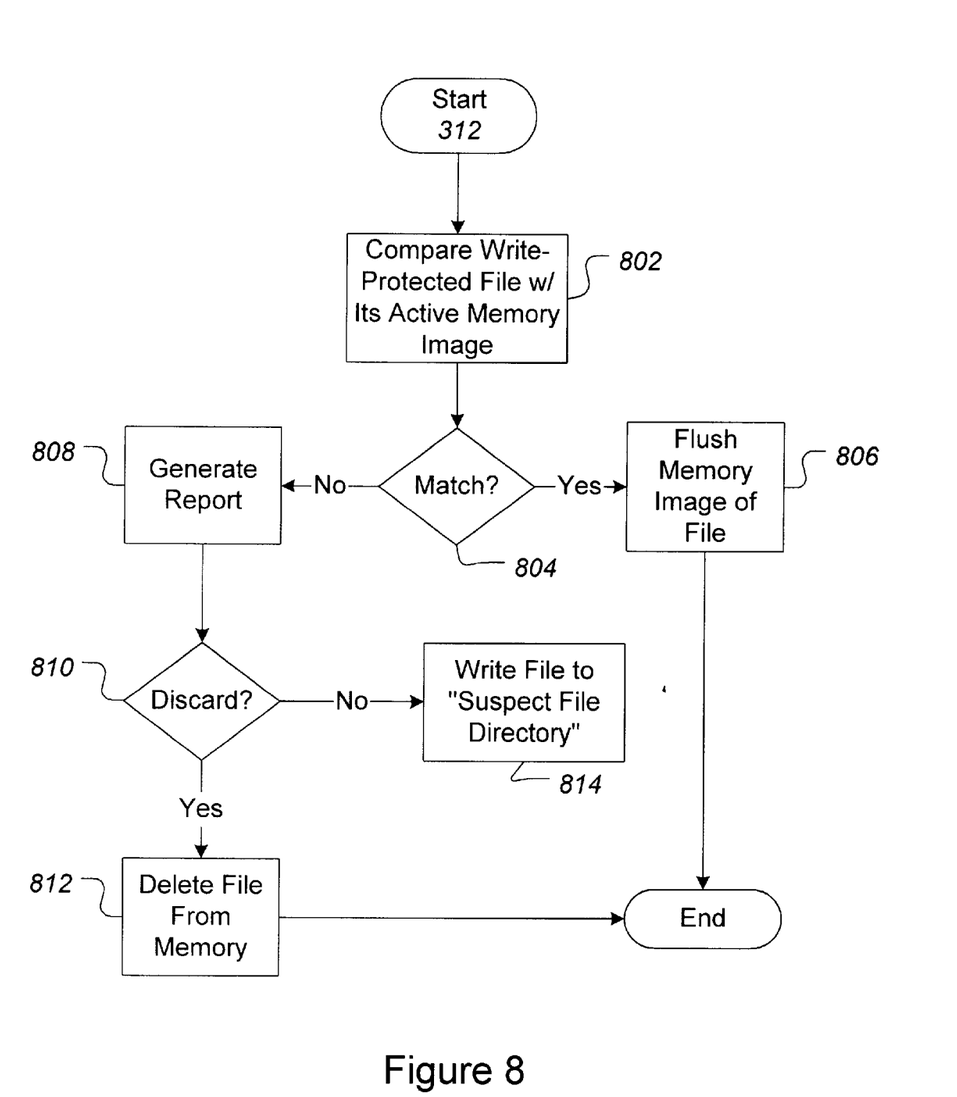
FIG. 8 is a flowchart illustrating the operation of one aspect of step 312 in greater detail.

Returning yet again to FIG. 3, the session is completed and the user's computer disconnected from the network at step 310. At step 312 the files installed on the Protected Partition are analyzed to determine whether any installed files have been altered and if any new files have been installed during the session. One embodiment of step 312 is illustrated in greater detail in FIG. 8. At step 802, the write-protected files are compared with their corresponding images in the Protected Partition. At step 804, a determination is made whether the write-protected and image files match. This can be done using a direct bit-by-bit comparison or other known means such as a checksum. If the write-protected and image files match, then, following the "Yes" branch of step 804 to step 806, the image is flushed from the memory and the process terminates. Alternatively, the write-protected file can be replaced with the image at the user's option. Otherwise, the "No" branch of step is followed to step 808 at which a report of the anomaly is made. At step 810 the user is offered the option of discarding the altered file. If the user chooses the keep the change (e.g., the user was aware of the change), then the "No" branch of step 810 is followed back to step 814, where the suspect file is stored in a special directory for further evaluation (e.g., for scanning by a virus detection program). Otherwise, the "Yes" branch of step 810 is followed to step 812 where the changed file is discarded and the process is terminated.

Returning again to FIG. 3, the original settings of the software and files stored in the Protected Partition are returned to their pre-session configurations to avoid any alterations to program parameters at step 314. This step will be appreciated to help prevent propagation of macro viruses and the like. The process described in FIG. 3 then terminates.

CONCLUSION

Thus, the present invention will be seen to address the deficiencies in the prior art by providing a relatively simple, efficient, and reliable method for protecting the integrity of data store on a computer connected to a computer network. In operation, a user configures the software and systems of the invention and connects to the network. Partitions are created to provide use of software and files needed for network access and use while protecting the integrity of the original software, data, and parameters. Information, especially instructions, are intercepted and filtered. Suspicious instructions are trapped and the user allowed to authorize execution selectively. Upon completion, the integrity of the data, software, and parameters is checked for consistency. The present invention thus provides a high degree of protection for a networked user regardless of the presence of a firewall.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many steps of processing can be implemented in a sequence different from that described herein without altering the invention. In addition, various steps can be implemented with user-defined parameters. A wide variety of marking schemes can be used with the present invention as well.

What is claimed:

1. A method of performing secure communication between a first computer under a user's control and a second remote computer over a computer network to maintain the integrity of data stored on said first computer, said method comprising the steps of:

a. partitioning the data space of said first computer into a first secure portion and a second network interface portion;

b. establishing communication between said first and said second computers over said computer network;

c. initializing a redirection mechanism and a filter mechanism on said first computer;

d. receiving an instruction or data on said first computer;

e. if an instruction is received on said first computer, then analyzing said instruction or data with said redirection mechanism and passing said instruction to said filter mechanism if said instruction is a protected instruction;

f. verifying said protected instruction using said filter mechanism; and g. processing said protected instruction using said second network interface portion if said protected instruction is verified successfully by said filter mechanism.

2. The method of claim 1, wherein said step of partitioning includes determining which data and instructions maintained in said secure portion of said data space of said first computer are necessary for performing said communication between said first and said second computers and copying said files to said network interface portion.

3. The method of claim 2, further including the step of disconnecting said first computer from said computer network and comparing the files stored in said network interface portion of said data space with files stored in said first secure portion.

4. The method of claim 3, further including the step of restoring any files that were changed during said communication to their original state.

5. The method of claim 1, further including the step of passing said instruction to the operating system of said first computer if said instruction is not a protected instruction.

6. The method of claim 1, further including the step of notifying said user of said first computer that said received instruction is a protected instruction.

7. The method of claim 6, further including the step of providing said user an option to allow execution of said protected instruction.

8. The method of claim 7, further including the step of disallowing said received instruction if said received instruction is not verified by said filter mechanism.

9. The method of claim 1, further including the step of disallowing said received instruction if said received instruction is not verified by said filter mechanism.

10. The method of claim 1, wherein said step of partitioning further includes the sub-step of tagging or marking data and instructions associated with said data space of said first computer.

11. The method of claim 10, wherein said step of verifying further includes the step of determining whether said instruction or data is tagged or marked.

12. The method of claim 1, wherein said step of receiving an instruction or data further includes the sub-step of tagging or marking said instruction or data received by said first computer.

13. The method of claim 12, wherein said step of verifying further includes the step of determining whether said received data or instruction is tagged or marked.

14. A system for performing secure communication between a first computer containing secure data in a data space associated with said first computer and a second remote computer over a computer network, said system comprising:

a. a first data space partition configured to store data such that said data cannot be modified during said communication between said first and second computers;

b. a second data space partition configured to store data to enable communication between said first and second computers over said network;

c. a redirection mechanism configured to receive data and instructions from said second computer over said computer network, said redirection mechanism being configured to determine whether said received data and instructions include instructions to perform protected operations; said redirection mechanism being coupled with d. a filter mechanism configured to receive said instructions to perform protected operation from said redirection mechanism and verify said instructions.

15. The system of claim 14, wherein said second data space partition includes images of files stored in said first data space partition, said images including operating system files for enabling images of executable files stored in said second data space partition to function.

16. The system of claim 15, wherein said filter is further coupled to forward verified instructions to said images to execute said verified instructions in said second data space partition.

17. The system of claim 16, wherein the operating system of said first computer is stored in said first data space partition, and said redirection mechanism is further coupled with said operating system such that non-protected instructions can be passed from said redirection mechanism to said operating system directly.

18. The system of claim 15, further including a comparator configured to compare files stored in said first data space partition with image files stored in said second data space partition to determine if said image files have been altered.

19. The system of claim 14, wherein said filter mechanism is further configured to abort protected instructions that are not verified.

20. The system of claim 19, wherein said filter mechanism is further configured to alert said user to a non-verified instruction and wherein said system further includes an override mechanism configured to allows said user to enable the execution of said non-verified instruction and cancel said abortion of said non-verified instruction.

21. A computer-readable medium having computer-readable program code devices embodied thereon, said computer-readable program code devices being configured to cause a computer to perform the steps of:

a. partitioning the data space of said first computer into a first secure portion and a second network interface portion;

b. establishing communication between said first and said second computers over said computer network;

c. initializing a redirection mechanism and a filter mechanism on said first computer;

d. receiving an instruction or data on said first computer;

e. if an instruction is received on said first computer, then analyzing said instruction with said redirection mechanism and passing said instruction to said filter mechanism if said instruction is a protected instruction;

f. verifying said protected instruction using said filter mechanism; and g. processing said protected instruction using said second network interface portion if said protected instruction is verified successfully by said filter mechanism.

22. The computer-readable medium of claim 21, wherein said step of partitioning includes determining which data and instructions maintained in said secure portion of said data space of said first computer are necessary for performing said communication between said first and said second computers and copying said files to said network interface portion.

23. The computer-readable medium of claim 22, further including the step of disconnecting said first computer from said computer network and comparing the files stored in said network interface portion of said data space with files stored in said first secure portion.

24. The computer-readable medium of claim 23, further including the step of restoring any files that were changed during said communication to their original state.

25. The computer-readable medium of claim 21, further including the step of passing said instruction to the operating system of said first computer if said instruction is not a protected instruction.

26. The computer-readable medium of claim 21, further including the step of notifying said user of said first computer that said received instruction is a protected instruction.

27. The computer-readable medium of claim 26, further including the step of providing said user an option to allow execution of said protected instruction.

28. The computer-readable medium of claim 27, further including the step of disallowing said received instruction if said received instruction is not verified by said filter mechanism.

29. The computer-readable medium of claim 21, further including the step of disallowing said received instruction if said received instruction is not verified by said filter mechanism.

30. The computer-readable medium of claim 21, wherein said step of partitioning further includes the sub-step of tagging or marking data and instructions associated with said data space of said first computer.

31. The computer-readable medium of claim 30, wherein said step of verifying further includes the step of determining whether said instruction is tagged or marked.

32. The computer-readable medium of claim 21, wherein said code devices are further configured to perform tagging or marking of said instruction or data received by said first computer.

33. The computer-readable medium of claim 32, wherein said step of verifying further includes the step of determining whether said instruction or data is tagged or marked.

* * * * *